(12) United States Patent
Prescott et al.

(10) Patent No.: US 8,851,243 B2
(45) Date of Patent: Oct. 7, 2014

(54) BRAKE ACTUATOR

(75) Inventors: Robert David Prescott, Solihull (GB); Laurence John Potter, Moseley (GB); Edward Gilbert Shaw, Inkberrow (GB)

(73) Assignee: Haldex Brake Products Limited, Worcestershire (GB)

( * ) Notice: Subject to any disclaimer, the term of this patent is extended or adjusted under 35 U.S.C. 154(b) by 114 days.

(21) Appl. No.: 13/262,188

(22) PCT Filed: Mar. 29, 2010

(86) PCT No.: PCT/GB2010/050529
§ 371 (c)(1), (2), (4) Date: Sep. 29, 2011

(87) PCT Pub. No.: WO2010/112906
PCT Pub. Date: Oct. 7, 2010

(65) Prior Publication Data
US 2012/0031717 A1    Feb. 9, 2012

(30) Foreign Application Priority Data
Apr. 1, 2009    (GB) .................................. 0905637.5

(51) Int. Cl.
| B60T 11/10 | (2006.01) |
| F16D 65/28 | (2006.01) |
| B60T 17/16 | (2006.01) |
| B60T 17/08 | (2006.01) |
| F16D 127/06 | (2012.01) |
| F16D 121/02 | (2012.01) |
| F16D 125/58 | (2012.01) |
| F16D 129/02 | (2012.01) |

(52) U.S. Cl.
CPC .................. B60T 17/16 (2013.01); F16D 65/28 (2013.01); *F16D 2127/06* (2013.01); *F16D 2121/02* (2013.01); *F16D 2125/582* (2013.01); *F16D 2129/02* (2013.01); B60T 17/083 (2013.01)
USPC .......................... 188/153 R; 188/67; 188/265

(58) Field of Classification Search
CPC .......... F16D 2127/06; F16D 2125/582; F16D 2125/70; B60T 17/16; B60T 17/10
USPC ............ 188/67, 265, 153 D, 170, 353, 153 R, 188/106 F; 92/63, 130 A, 130 R, 130 B
See application file for complete search history.

(56) References Cited

U.S. PATENT DOCUMENTS

| 3,255,676 | A | * | 6/1966 | Berg et al. ......................... 92/29 |
| 3,326,090 | A | * | 6/1967 | Cruse ................................ 92/24 |
| 3,498,188 | A | * | 3/1970 | Rodriguez ....................... 92/29 |
| 3,908,804 | A | * | 9/1975 | Cochran ........................ 188/170 |
| 4,083,436 | A | * | 4/1978 | Straut ........................... 188/265 |
| 4,425,005 | A |   | 1/1984 | Warwick |
| 5,176,227 | A | * | 1/1993 | Kohler ............................ 188/59 |
| 5,558,408 | A | * | 9/1996 | Naedler et al. .................... 303/7 |
| 5,954,162 | A | * | 9/1999 | Feigel et al. ................ 188/72.6 |
| 7,097,011 | B2 |  | 8/2006 | Severinsson |
| 7,163,090 | B2 | * | 1/2007 | Huber et al. .................. 188/170 |
| 8,424,655 | B2 | * | 4/2013 | Iraschko ....................... 188/170 |
| 2012/0019054 | A1 | * | 1/2012 | Potter et al. ..................... 303/14 |
| 2012/0024642 | A1 | * | 2/2012 | Prescott et al. ........... 188/151 R |

FOREIGN PATENT DOCUMENTS

| DE | 103 52 030 | 6/2005 |
| EP | 1 524 163 | 4/2005 |
| EP | 1729026 | 12/2006 |
| GB | 2234028 | 1/1991 |
| GB | 2 399 144 | 9/2004 |
| GB | 2 416 010 | 1/2006 |
| WO | WO 99/24299 | 5/1999 |
| WO | WO 2004/005099 | 1/2004 |

OTHER PUBLICATIONS

International Search Report of PCT/GB2010/050529; Issued Jul. 21, 2010.

* cited by examiner

*Primary Examiner* — Bradley King
*Assistant Examiner* — Nicholas J Lane
(74) *Attorney, Agent, or Firm* — Young Basile Hanlon & MacFarlane P.C.

(57) ABSTRACT

A brake actuator (10) having a housing (12) in which is provided a movable brake actuating assembly (18, 30), the brake actuating assembly (18, 30) being movable between a brake apply position which, in use results in the application of a brake to which the actuator (10) connected, and a brake release position which, in use, results in the release of the brake, the brake actuator (10) further including a lock (34) which is operable to prevent movement of the brake actuating assembly (18, 30) from the brake apply position to the brake release position, the brake actuating assembly (18, 30) including a first movable member (18), a second movable member (30) and a resilient biasing element (32) which extends between the second movable member (30) and the first movable member (18) and which, if one of the first or second movable members (18, 30) is moved relative to the other from an equilibrium separation, exerts a force tending to return the first (18) and second (30) movable members to the equilibrium separation, the brake actuator (10) further including compliance control chamber (50) between the first movable member (18) and the second movable member (30), the compliance control chamber (50) having a port (58*a*) and being sealed such that flow of fluid into or out of the compliance control chamber (50) other than through the port is substantially prevented.

16 Claims, 6 Drawing Sheets

BRAKE ACTUATOR

CROSS-REFERENCE TO RELATED APPLICATION

This application is a U.S. national phase of PCT/GB2010/050529, filed Mar. 29, 2010, and claims priority to GB 0905637.5, filed Apr. 1, 2009, the disclosures of which are incorporated herein by reference for all purposes.

FIELD OF THE INVENTION

The present invention relates to a brake actuator, particularly, but not exclusively to a pneumatically operated brake actuator for use in the braking system of a heavy goods vehicle.

BACKGROUND OF THE INVENTION

Braking of a vehicle is normally required for two reasons—to decelerate the vehicle when the vehicle is in motion (generally referred to as service braking), or to ensure that the vehicle does not move when it is parked. Service braking is usually effected by the driver operating a foot pedal, with a separate lever, usually manually operable, being provided to actuate and hold the brake or brakes on whilst the vehicle is parked. In both cases, however, each vehicle brake is typically moved to the applied position by means of a fluid pressure operable brake actuator.

Two sorts of fluid pressure operable brake actuators are known—a lock actuator, and a spring brake actuator. In the both of these, service braking is achieved by the movement of a piston or diaphragm which divides a service brake housing into first and second chambers. The piston or diaphragm carries an actuating rod, which extends from the first chamber and through an aperture in the service brake housing, and which is mechanically connected to a brake. In order to apply the brake, a fluid pressure (typically pneumatic) braking operating signal is supplied to the second chamber, and this causes the piston or diaphragm to move so that the actuating rod is pushed out of the housing to an extended position. A return spring is provided in the first chamber to return the piston or diaphragm and actuating rod to the retracted position when the fluid pressure is exhausted from the second chamber.

In the case of a lock actuator, operation of the parking brake causes a locking device to operate to mechanically lock the actuating rod (and possibly also the piston/diaphragm) in the extended position. The brake will thus remain applied even if fluid pressure is exhausted from the second chamber, until the parking brake, and hence the lock is released. There are, however, problems with existing embodiments of lock actuator, in particular when used to apply a very hot brake, as may occur shortly after stopping a laden vehicle previously travelling at high speed. Specifically, when used to actuate a drum brake, it was found that, if the vehicle was left with the parking brake applied for some time, shrinkage of the drum upon cooling could cause an increase in the brake force to such a level that the brakes become difficult if not impossible to release and/or the drum distorted or cracked. Alternatively, when used to actuate a disc brake, shrinkage of the disc upon cooling could cause the braking force to reduce over time to such an extent that a vehicle parked on a hill could be permitted to roll down the hill.

In view of these significant disadvantages, it is more common to use a spring brake actuator, particularly in heavy goods vehicles. In a spring brake actuator, rather than the actuating rod being mechanically locked in position when the parking brake is actuated, it is urged into the extended position by means of a heavy duty spring which is provided in a spring brake housing.

The spring extends between the spring brake housing and a further piston or diaphragm which divides the spring brake housing into two chambers—hereinafter referred to as the third and fourth chambers. The spring is located in the third chamber and the fourth chamber lies between the third chamber and the second chamber in the service brake housing. The spring brake piston/diaphragm is provided with an actuating rod which extends from the fourth chamber into the second chamber, where, under the biasing force of the spring, it pushes the service brake piston/diaphragm into the extended (i.e. brake applied) position. In order to release the brake, pressurised fluid is supplied to the fourth chamber to move the spring brake piston/diaphragm against the biasing force of the spring, which allows the service brake piston/diaphragm to return to the retracted position.

Whilst this arrangement does not suffer from the drawbacks of a lock actuator described above, it has to be relatively large to accommodate the additional chambers and a spring large enough to provide the desired braking force. It is an object of the invention to provide an actuator which is relatively compact and which minimises or avoids the problems associated with conventional lock actuators.

SUMMARY OF THE INVENTION

According to a first aspect of the invention we provide a brake actuator having a housing in which is provided a movable brake actuating assembly, the brake actuating assembly being movable between a brake apply position which, in use results in the application of a brake to which the actuator connected, and a brake release position which, in use, results in the release of the brake, the brake actuator further including a lock which is operable to prevent movement of the brake actuating assembly from the brake apply position to the brake release position, the brake actuating assembly including a first movable member, a second movable member and a resilient biasing element which extends between the second movable member and the first movable member and which, if one of the first or second movable members is moved relative to the other from an equilibrium separation, exerts a force tending to return the first and second movable members to the equilibrium separation, the brake actuator further including compliance control chamber between the first movable member and the second movable member, the compliance control chamber having a port and being sealed such that flow of fluid into or out of the compliance control chamber other than through the port is substantially prevented.

More specifically, the resilient biasing element may be configured to exert a force tending to return the first and second movable members to the equilibrium separation when one of the first or second movable members is moved relative to the other to decrease the separation of the first and second movable members.

The resilient biasing means may be a helical spring.

Preferably a braking control chamber is provided between the housing and the brake actuating assembly, and the brake actuating assembly is movable under the influence of fluid pressure in the braking control chamber.

Preferably, during operation of the lock, movement of the brake actuating assembly from the brake apply position to the brake release position is prevented by the lock acting on the second movable member to restrict movement of the second movable member.

Preferably the lock includes a latch part which is movable into engagement with the second movable member to restrict movement of the second movable member.

Preferably there is a substantially fluid tight seal between the second movable member and the housing so that the second movable member and the housing form the braking control chamber. In this case, the housing advantageously includes an inlet which extends from the exterior of the housing into the braking control chamber. Movement of the brake actuating assembly within the housing may therefore be achieved by the introduction of pressurised fluid into the variable volume chamber via the inlet.

The brake actuator may further include a second resilient biasing element which extends between the first movable member and the housing member and which, if the first movable member is moved relative to the housing from the brake release position, exerts a force tending to return the first movable members to the brake release position.

Advantageously, flow of fluid into or out of the compliance control chamber other than via the port is prevented by virtue of the provision of a substantially fluid tight seal between the first movable member and the second movable member, the seal being configured to permit movement of one of the first or second movable members relative to the other whilst preventing flow of fluid into or out of the chamber other than via the port. The resilient biasing element is preferably not contained within the compliance control chamber.

A restrictor may be provided to restrict flow of fluid through the port into the compliance control chamber relative to flow of fluid through the port to exit the compliance control chamber.

The first movable member may be either a diaphragm or a piston, and the second movable member may be either a diaphragm or a piston.

According to a second aspect of the invention we provide a braking control assembly including a modulator which has a supply inlet connected to a source of pressurised fluid, an exhaust outlet which is vented to a low pressure region, and a delivery port, the modulator being operable to move between a build position in which the supply inlet is connected to the delivery port and the exhaust outlet substantially closed, an exhaust position in which the delivery port is connected to the exhaust outlet and the supply inlet is substantially closed, the braking assembly further including a brake actuator according to the first aspect of the invention, wherein there is a substantially fluid tight seal between the second movable member and the housing so that the second movable member and the housing form a braking control chamber, the housing including an inlet which extends from the exterior of the housing into the braking control chamber, and the inlet being connected to the delivery port of the modulator.

Preferably, the port is connected to the source of pressurised fluid.

BRIEF DESCRIPTION OF THE DRAWINGS

An embodiment of the invention will now be described, by way of example only, and with reference to the accompanying drawings of which.

DETAILED EMBODIMENTS OF THE INVENTION

Figure 1:
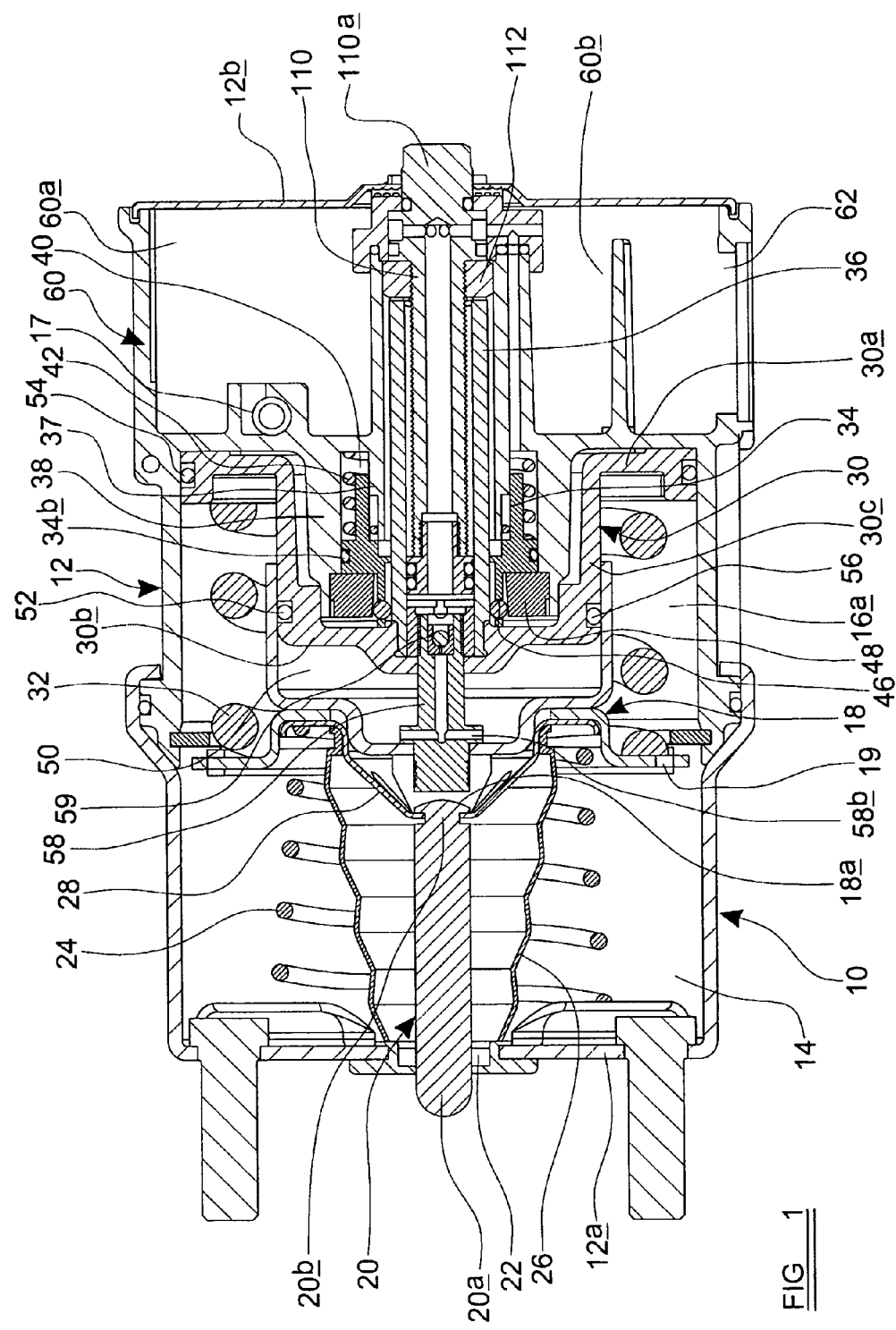
FIG. 1 shows cross-section through a braking assembly including a brake actuator according to the invention.
Figure 2:
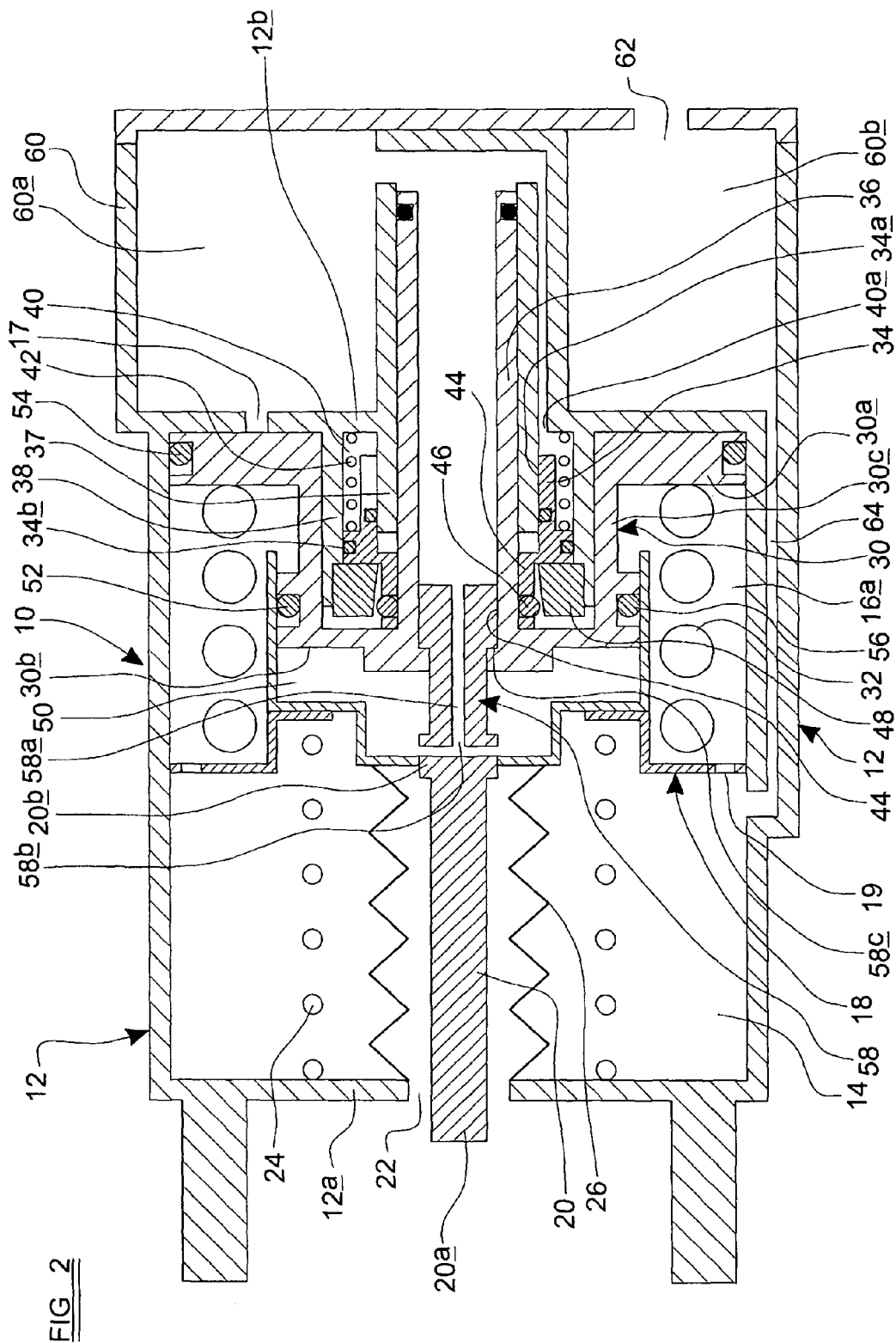
FIG. 2 shows a schematic illustration of a cross-section through the brake actuator shown in FIG. 1, the brake actuator being in a passive state in which no braking force is applied.

Referring now to FIGS. 1 to 5, there is shown a brake actuator 10 having a housing 12 which is divided into a first chamber 14, hereinafter referred to as the return spring chamber 14, and a second chamber by means of a first movable member, which in this example is a piston hereinafter referred to as the spring support piston 18. Whilst use of a piston is described in this embodiment of the invention, it will be appreciated that a diaphragm or rolling diaphragm could be used instead. On the spring support piston 18 is mounted a brake actuating rod 20 which extends from the piston into the return spring chamber 14 and out through an aperture 22 in an end face 12a of the housing 12. The rod 20 extends with its longitudinal axis generally perpendicular to the plane of the spring support piston 18, such that movement of the spring support piston 18 in the housing 12 causes the rod 20 to move in a direction generally parallel to its longitudinal axis. The brake actuating rod 20 is, in use, mechanically connected to a vehicle disc brake (not shown) such that this axial movement of the rod 20 out of the housing 12 causes the brake to apply a braking force to a vehicle wheel, the braking force being removed by axial movement of the rod 20 back into the housing 12. The extended position of the rod 20 in which a braking force is applied will hereinafter be referred to as the brake apply position, and the retracted position of the rod 20 as the brake release position.

A resilient biasing element, in this example a helical spring hereinafter referred to as the return spring 24, surrounds the actuating rod 20, and extends between a first end face 12a of the housing 12 and the spring support piston 18, movement of the spring support piston 18 and rod 20 from the brake release position to the brake apply position causing the return spring 24 to be compressed from its equilibrium state. The return spring 24 therefore exerts a biasing force on the spring support piston 18 when the rod 20 is in the brake apply position, the biasing force tending to return the rod 20 to the brake release position. It should be appreciated that the return spring 24 is relatively weak, and the bulk of the return force acting on the spring support piston 18 is provided by the resilience of the braking mechanism. The return spring 24 is mainly effective towards the end of the travel of the spring support piston 18 to its retracted position when the brakes are disengaged, and is provided to ensure that the spring support piston 18 completes its movement back to the fully retracted position.

Whilst not absolutely necessary for the functioning of the actuator 10, a seal may be provided to substantially prevent flow of fluid from the return spring chamber 14 through the aperture 22 to the exterior of the housing 12. The seal may extend between the housing 12 surrounding the aperture 22 and the rod 20, and provide a substantially fluid tight seal whilst allowing axial movement of the rod 20. More preferably, however, the seal is provided by means of a flexible sleeve 26, known as a boot, which extends between the rod 20 and the return spring 24 from the housing 12 surrounding the aperture 22 to the spring support piston 18, the boot 26 being compressed in a concertina fashion as the rod 20 moves from the brake release position to the brake apply position.

In use, the end face 12a of the brake actuator housing 12 is typically engaged with a housing of a brake calliper (not shown), a substantially fluid tight seal being provided between the brake actuator housing 12 and the brake calliper housing. The provision of the boot 26 means that fluid from the return spring chamber 14 is prevented from entering the brake calliper. This is particularly important if the return spring chamber 14 is open to the atmosphere, and therefore contains water vapour or salt from the road surface, as such contaminants could cause corrosion of and serious damage to the brake calliper.

In this example, the mechanical connection between the actuating rod 20 and the vehicle brake typically requires a small degree of variation in the angular position of the rod 20 relative to the direction of movement of the piston 18 (of the order of ±4° from the direction of movement of the spring support piston 18. This is accommodated by securing the rod 20 to the spring support piston 18 by means of a generally flexible disc 28 (shown only in FIG. 1 for clarity). A first end 20a of the rod 20 extends through the aperture 22 in the housing 12, whilst a second opposite end 20b of the rod 20, which is provided with a convex curved end surface, engages with a corresponding concave curved central portion 18a of the spring support piston 18. The curved central portion 18a of the spring support piston 18 thus acts as a bearing for the second end 20b of the rod 20, and the disc 28 is sufficiently flexible to allow the rod 20 to pivot about its second end 20b through an angle of around 8°.

The brake actuator is also provided with a second movable member, in this example a second piston hereinafter referred to as the service braking piston 30. Again, a diaphragm or rolling diaphragm could equally be used in the place of a piston. This divides the second chamber into two further chambers—a spring chamber 16a and a service braking control chamber 16b, the spring chamber 16a being between the service braking piston 30 and the spring support piston 18, and the service braking control chamber 16b being between a second end face 12b of the housing 12 and the service braking piston 30. A plurality of breathing apertures 19 are provided in the spring support piston 18 which connect the return spring chamber 14 to the spring chamber 16a.

A second resilient biasing means, in this example a helical spring hereinafter referred to as the compliance spring 32, is provided in the spring chamber 16a, and extends between and is secured at each end to the spring support piston 18 and the service braking piston 30.

An aperture, hereinafter referred to as the service braking chamber port 17 is provided in the second end face 12b of the housing 12, and this is connected to the delivery port of a modulator (not shown). The modulator is provided with an inlet port, a delivery port and an exhaust port, the inlet port being connected to a source of pressurised fluid, typically compressed air, and the exhaust port being connected to a low pressure volume, typically vented to atmosphere. The modulator is controllable, typically by means of at least one solenoid operated valve, to move between a build position in which the inlet port is connected to the delivery port (and hence the service braking chamber 16b) and the exhaust port closed, an exhaust position in which the delivery port (and hence the service braking chamber 16b) is connected to the exhaust port, and the inlet port closed, and a hold position in which all three ports are closed. The details of suitable configurations of modulator are given in our co-pending patent application GB0902989.3, or application GB2407131 for examples.

Figure 3:
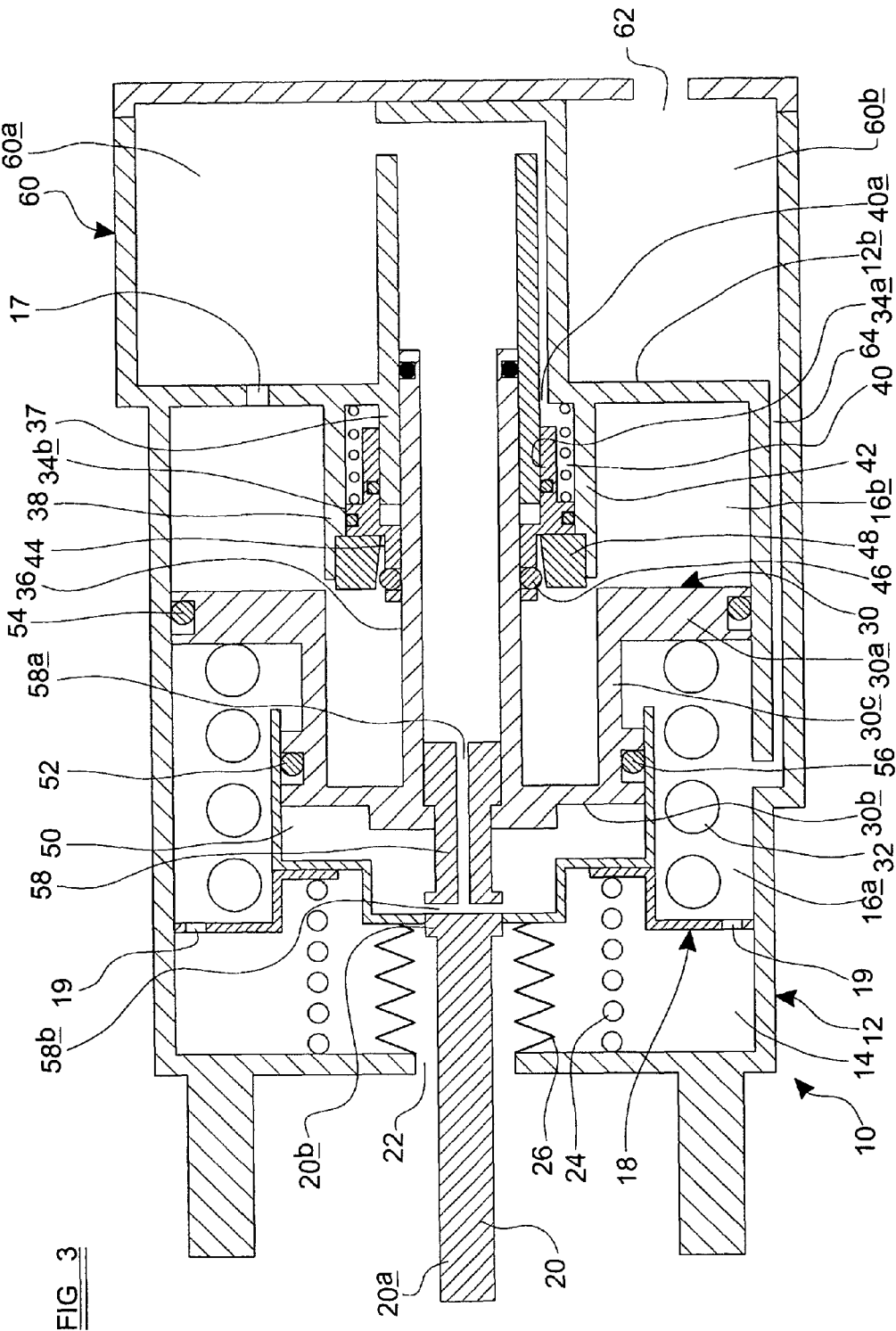
FIG. 3 shows a schematic illustration of a cross-section through the brake actuator shown in FIG. 1, the brake actuator being an active state as adopted during service braking.

The brake actuator 10 may therefore be used to effect service braking by operating the modulator so that it adopts the build position, thus connecting the service braking chamber 16b to the supply of pressurised fluid via the service braking chamber port 17. The increasing pressure in the service braking chamber 16b pushes the service braking piston 30 towards the spring support piston 18. The compliance spring 32 does not deform under the pressure of fluid in the service braking chamber 16b until this exceeds a predetermined amount, in this example around 5.9 bar, and therefore, initially at least, both the service braking piston 30 and the spring support piston 18 move together, as if connected by a rigid connection, under the influence of the increasing fluid pressure in the service braking chamber 16b so as to decrease the volume of the return spring chamber 14. This, of course, has the effect of moving the spring support piston 18 and rod 20 from the brake release position to the brake apply position, as illustrated in FIG. 3.

Whilst it would be theoretically possible to hold the applied braking force during parking of the vehicle by moving the modulator to the hold configuration in order to retain the fluid pressure in the service braking chamber 16b, this is not practically viable as the seals in the system, whilst good enough to retain the fluid pressure during for the durations typically required for service braking, will not retain the high fluid pressure required to applied the desired braking force for significant periods of time. Thus, leakage of pressurised fluid from the system would cause the brakes to be slowly released if the vehicle were parked for any significant period of time. This would clearly be unacceptable, and, consequently, it is a legal requirement that the parking brake is held by a purely mechanical device. A locking means is therefore provided to mechanically lock the spring support piston 18 and the rod 20 in the brake apply position.

Whilst it will be appreciated that the exact configuration of locking means is not critical, and other locking mechanisms, for example of the type used on caulking hand guns, may be used. In this example, however, the locking means is fluid pressure operated, and relies on frictional forces resulting from the engagement of a plurality of ball bearings, or rollers, with a portion of the service braking piston preventing movement of the service braking piston 30.

This embodiment of locking means comprises a locking piston 34 which is mounted around a generally cylindrical locking tube 36 which extends from generally the centre of the service braking piston 30 into the service braking chamber 16b. A first tubular extension portion 37 extends from the second end face 12b of the housing 12 into the service braking chamber 16b, and the locking tube 36 extends into the cylindrical space enclosed by the first extension portion 37. Sealing means, in this example an O-ring, is provided on the locking tube 36 to provide a substantially fluid tight seal between the locking tube 36 and the first extension portion 37 whilst permitting the locking tube 36 to slide inside the extension portion 37 as the service braking piston moves under the influence of fluid pressure in the service brake control chamber 16b.

A generally cylindrical inner surface 34a of the locking piston 34 engages with an outer surface of the first extension portion 37, whilst a generally cylindrical outer surface 34b of the locking piston 34 engages with a second generally cylindrical tubular extension portion 38 which is located around and spaced from the first extension portion 37 and also extends from the second end face 12b of the housing 12 into the service braking chamber 16b. A generally annular chamber, hereinafter referred to as the locking control chamber 40, is therefore formed between the locking piston 34 and the second end face 12b of the housing 12.

Sealing means, in this example O-rings, are provided in a groove in each of the inner 34a and outer 34b surfaces of the locking piston 34 to provide a substantially fluid tight seal between the locking piston 34 and the extension portions 37, 38. A second aperture, hereinafter referred to as the locking chamber port 40a, is provided in the second end face 12b of the housing 12 and extends from the exterior of the housing 12 into the locking control chamber 40. The locking chamber port 40a is connected to a source of pressurised fluid.

Resilient biasing means, in this example a helical spring hereinafter referred to as the locking return spring 42, is provided in the locking control chamber 40, extending between the second end face 12b of the housing 12 and the locking piston 34. It will therefore be appreciated the movement of the locking piston 34 against the biasing force of the locking return spring 42 to decrease the volume of the locking control chamber 40 may be achieved by the exhausting of pressurised fluid from the locking control chamber 42 via the locking chamber port 40a, whilst retaining fluid pressure in the service braking chamber 16b.

A locking ring 48 is mounted at the free end of the second extension portion 38, the locking ring 48 having a generally cylindrical outer surface which engages with an inner surface of the second extension portion 38 and an inner surface with a generally circular transverse cross-section which tapers from a larger diameter to a smaller diameter moving from a first end of the locking ring 48 towards the second end face 12b of the housing 12. The angle of the taper is around 5° from the longitudinal axis of the locking ring 48. The locking piston 34 is located between the locking ring 48 and the second end face 12b of the housing 12.

The locking means is also provided with a generally cylindrical tubular carrier part 44 which extends from the locking piston 34 into the service braking chamber 16b around the locking tube 36. The carrier part 44 is located in the space between the tapered inner surface of the locking ring 48 and the locking tube 34, and provides a race in which a plurality of ball bearings 46 are supported. The ball bearings 46 protrude from inner and outer surfaces of the carrier part 44 so that an inner portion of each ball bearing 46 engages with the locking tube 36 whilst an outer portion of each ball bearing 46 may, by movement of the locking piston 34 and carrier part 44 towards the second end face 12b of the housing 12, be brought into engagement with the inner, tapered surface of the locking ring 48.

The angle of the taper of the inner surface of the locking ring 48 is selected according to the coefficient of friction between the ball bearing and the locking tube 36, which in this example is the coefficient of friction of greased steel on greased steel. When the ball bearings 46 are engaged with the locking ring 48 and an attempt is made to move the locking piston 34 to reduce the volume of the service braking chamber 16b, the ball bearings 46 are pushed by the locking ring 48 against the locking tube 36, the direction of the force between each ball bearing 46 and the locking tube 36 depending on the angle of taper of the inner surface of the locking ring 48. This is selected so that the magnitude of the component of the force between each ball bearing 46 and the locking tube 36 normal to the outer surface of the locking tube 36 is such that the frictional force resisting sliding movement of the ball bearings 46 relative to the locking tube 36 is always greater than the force applied to move the service braking piston 30. Engagement of the ball bearings 46 with the locking tube 36 and locking ring 48 therefore acts to prevent movement of the service braking piston 30 to reduce the volume of the service braking chamber 16b.

Whilst in this example, the locking is achieved by engaging a plurality of ball bearings 46 between the locking tube 36 and the locking ring 48, this need not be the case. The locking tube 36 and the locking ring 48 need not have generally circular transverse cross-sections. For example, the exterior surface of the locking tube 36 and the interior surface of the locking ring 48 may be hexagonal or octagonal (or any other polyhedral shape), and, in this case, the ball bearings 46 may be replaced by a plurality of generally cylindrical rollers each of which is arranged with its longitudinal axis generally perpendicular to the longitudinal axis of the locking tube 36. When in the locked configuration, each roller engages with one of the external faces of the locking tube 36, and one of the internal faces of the locking ring 48.

The use of ball bearings 46 and a cylindrical locking tube 36 and locking ring 48 as described above can be advantageous in the arrangement described above where the service braking piston 30 is a piston (as opposed to a diaphragm), because, if operation of the actuator generates internal forces which tend to cause the service braking piston 30 to rotate in the housing 12, such rotation can be accommodated, and has no effect on the operation of the actuator 10. If the service braking piston 30 is replaced with a diaphragm which is secured by its periphery to the housing 12, the use of a rollers and a polyhedral locking tube might be preferred, as this would act against any such internal forces to substantially prevent any rotation of the service braking diaphragm which otherwise could cause damage to or effect movement of the diaphragm in the housing 12.

When parking the vehicle, the brake actuator may therefore be operated as follows. The brakes are applied by moving the spring support piston 18 and rod 20 from the brake release position to the brake apply position as described in relation to service braking above. During this process, as pressurised fluid is supplied to the service braking chamber 16b, pressurised fluid is also supplied to the locking control chamber 40 through the locking chamber port 40a, and this ensures that the locking return spring 42 remains uncompressed, and the ball bearings 46 retained spaced from the locking ring 48.

When the desired braking pressure is achieved, the locking means is actuated by exhausting fluid pressure from the locking control chamber 40 so that the fluid pressure in the service braking chamber 16b pushes the locking piston 34 against the biasing force of the locking return spring 42 to reduce the volume of the locking control chamber 40. This brings the ball bearings 46 into engagement with the locking ring 48. The modulator can then be operated to exhaust the fluid pressure from the service braking chamber 16b, engagement of the ball bearings 46 with the locking ring 48 and locking tube 36 preventing the service braking piston 30 from moving under the action of the biasing force of the return spring 24 to reduce the volume of the service braking chamber 16b as the fluid pressure in the service braking chamber 16b is reduced. In other words, the locking means locks the brakes in the applied position.

To release the parking brake, pressurised fluid is supplied to the locking control chamber 40 and the service braking chamber 16b. When the pressure in the service braking chamber 166 is relatively low, the force exerted on the locking piston 34 by the locking control chamber 40 and the locking return spring 42 is not sufficient to overcome the force exerted by the brake mechanism on the actuating rod 20 which acts to maintain the ball bearings 46 in engagement with the locking ring 48, i.e. to maintain the parking brake lock. To overcome this force, it is necessary for the fluid pressure in the service braking chamber 16b to be increased to around the same level it was at when the locking means was actuated to apply the lock. The fluid pressure in the service braking chamber 16b then counteracts the force exerted by the brake mechanism, and effectively "unloads" the lock, thus enabling the locking piston 34 to move under the action of the locking return spring 42 to increase the volume of the locking control chamber 40 and disengage the ball bearings from the locking ring 48. This allows the service piston 30, spring support piston 18 and rod 20 to move under the action of the return spring 24 to the brake release position.

Figure 4:
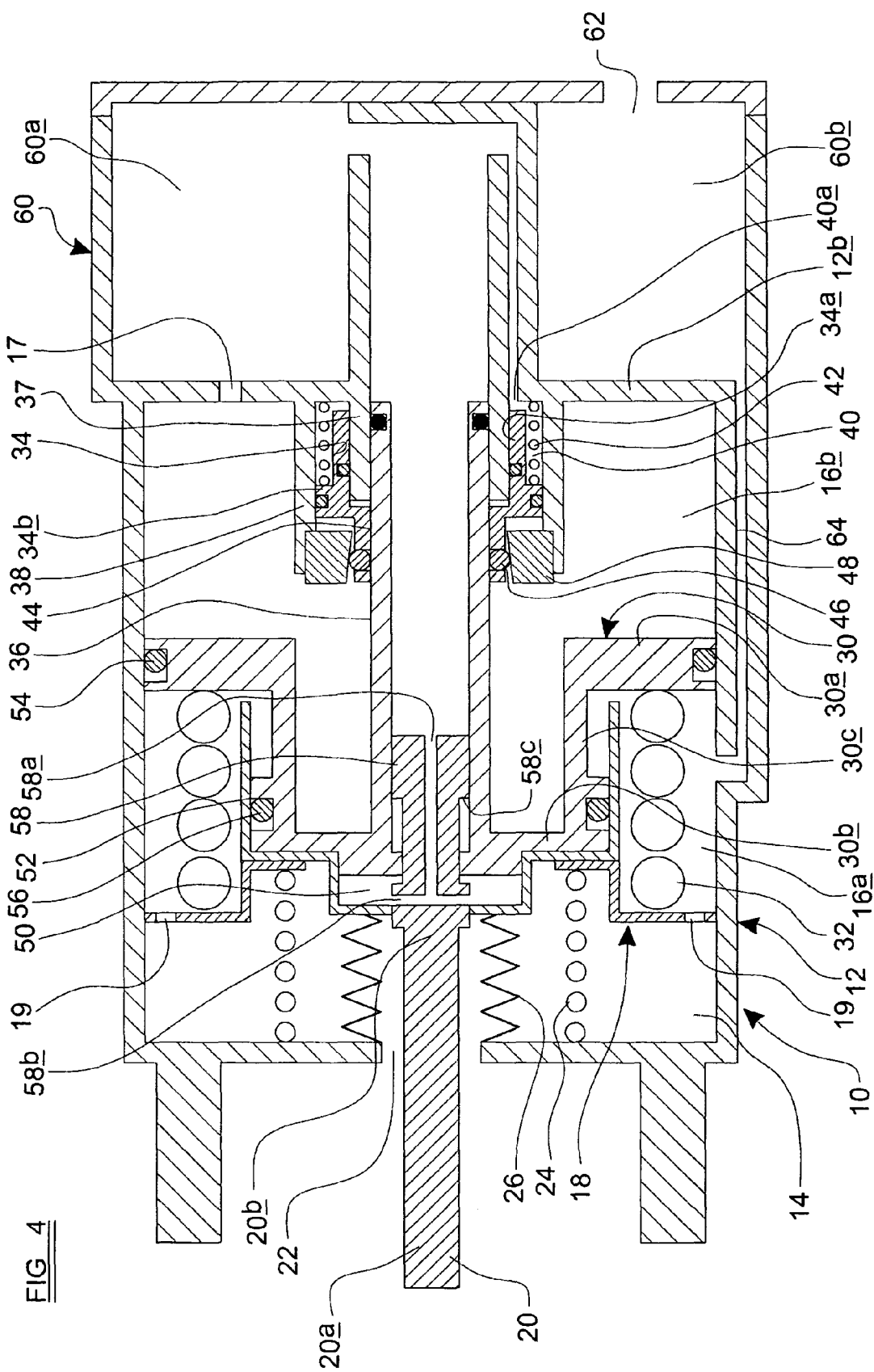
FIG. 4 shows a schematic illustration of a cross-section through the brake actuator shown in FIG. 1, the brake actuator being in an active state as initially adopted during application of the parking brake.

In order to avoid the problems associated with conventional locking actuators, when applying the parking brake the fluid pressure in the service braking chamber 16b is increased sufficiently to compress the compliance spring 32, before the locking means is actuated. This is illustrated in FIG. 4.

Figure 5:
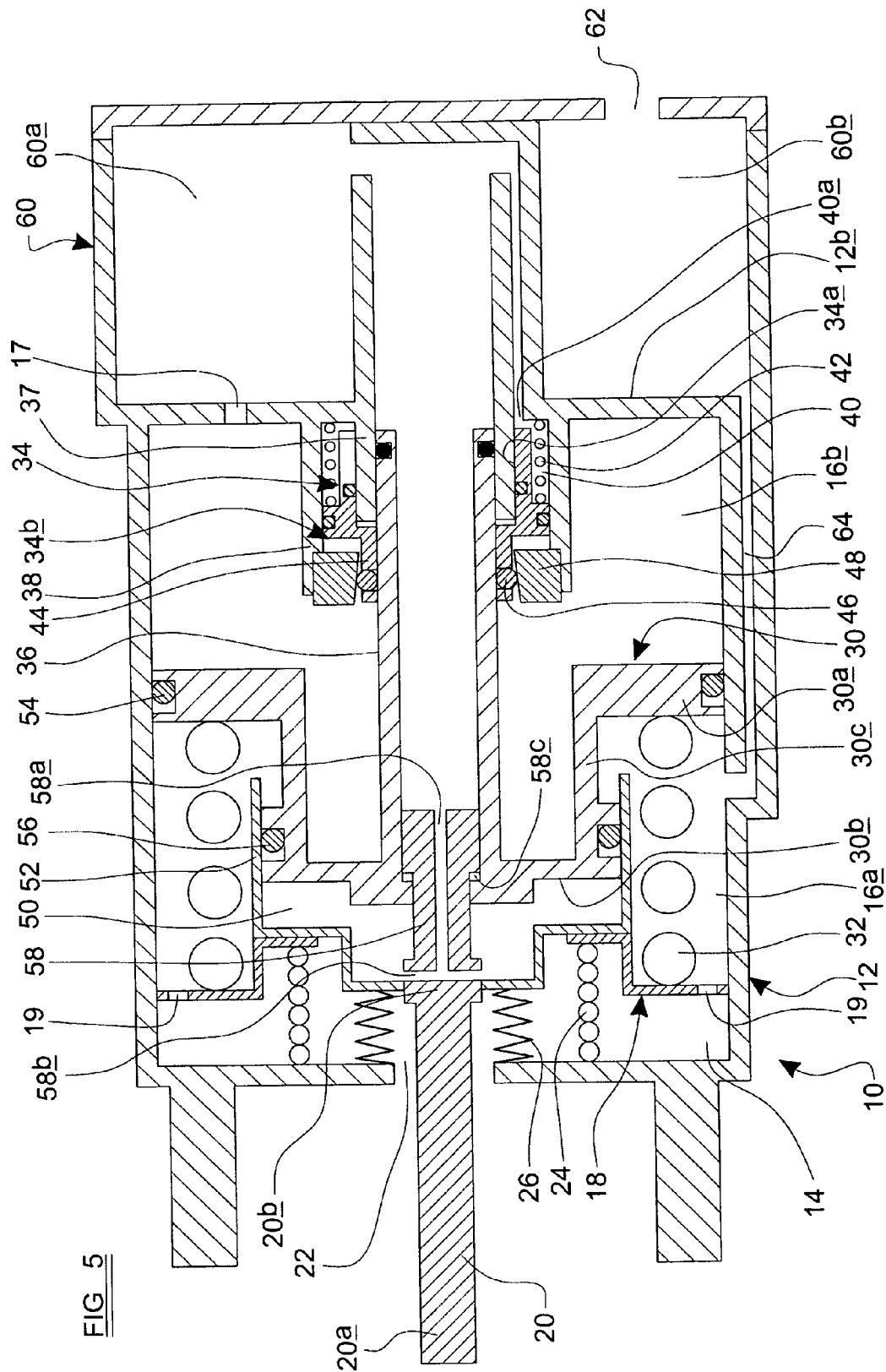
FIG. 5 shows a schematic illustration of a cross-section through the brake actuator shown in FIG. 1, the brake actuator being in an active state as adopted during application of the parking brake but after cooling of the brakes.

The provision of the compliance spring 32, and the compression of this spring 32 during application of the parking brake means that the braking force is retained at a generally constant value even after cooling of the brakes. If cooling of the brakes would cause the braking force to increase if the brake actuating rod 20 were locked in position, in the arrangement described above, cooling of the brakes will further compress the compliance spring 32 whilst maintaining the braking force at a generally constant level. Alternatively, if cooling of the brakes would cause the braking force to decrease if the brake actuating rod 20 were locked in position, in the arrangement described above, cooling of the brakes will cause the compliance spring 32 to expand whilst maintaining the braking force at a generally constant level. This is illustrated in FIG. 5.

Whilst a brake actuator including all the features described above would work as described above, with the compliance spring 32 providing the advantage discussed in the preceding paragraph, the brake actuator 10 in this example has been further improved by the inclusion of a further control chamber, hereinafter referred to as the compliance control chamber 50, between the spring support piston 18 and the service braking piston 30.

The spring support piston 18 is provided with a divider wall 52 which encloses a generally cylindrical space and which extends from the spring support piston 18 into the spring chamber 16a, the compliance spring 32 being located in the generally annular space between the divider wall 52 and the actuator housing 12. Whilst the breathing apertures 19 could be omitted from the spring support piston 18 and a substantially fluid tight seal provided between the spring support piston 18 and the housing, so that the entire space between the spring support piston 18 and the service braking piston 30 forms the compliance control chamber 50, in this example, the pistons 18, 30 are configured so that the compliance control chamber 50 occupies only a fraction of this space.

In order to achieve this, in this example, rather than being a generally planar disc, the service braking piston 30 has a top-hat shaped cross-section, and includes an annular outer part 30a, a generally circular centre disc 30b, the inside edge of the annular outer part 30a being connected to the edge of the centre disc 30b by a tubular connection part 30c. The outer edge of the annular outer part 30a engages with the actuator housing 12 to provide a substantially fluid-tight seal between the housing 12 and the piston 30 whilst permitting sliding movement of the piston 30 in the housing 12. In this example, the outer edge is provided with a groove in which is located an O-ring 54, or other suitable sealing element. The connection part 30c extends towards the spring support piston 18, and an end portion of the outer surface of the connection part 30c is surrounded by and engages with the inner surface of the divider wall 52 to provide a substantially fluid tight seal between the spring support piston 18 and the service braking piston 30. In this example, the outer surface of the connection part 30c is provided with a groove in which a further O-ring 56 or other suitable sealing part is provided.

The compliance control chamber 50 is therefore formed in the space between the spring support piston 18 and the centre disc 30b of the service braking piston 30 and is enclosed by the divider wall 52.

Flow of fluid into and out of the compliance control chamber 50 is provided for by means of an aperture provided in the centre disc 30b of the service braking piston 30. A compliance control tube 58, having an axially extending central bore 58a and a transverse bore 58b connecting the central bore 58a to the axially extending outer surfaces of the tube 58, extends from the spring support piston 18 through this aperture into the cylindrical space enclosed by the locking tube 36. A restrictor 59 (shown in FIG. 1 only for clarity) is provided in the central bore 58a of the compliance control tube 58, and this acts as a choke which restricts the rate of flow of fluid into the compliance chamber 50 but does not impede flow of fluid out of the compliance control chamber 50.

In this example, the compliance control tube 58 also provides a stop which limits the separation of the spring support piston 18 and the service braking piston 30. In this case the stop is a step 58c provided in the outer circumference of the compliance control tube 58 separating a smaller diameter portion of the tube 58 from a larger diameter portion of the tube 58, the larger diameter portion of the tube 58 being at the other end to the spring support piston 18. A corresponding step is provided in the wall of the centre disc 30b surrounding the aperture in the service braking piston 30 through which the compliance control tube 58 extends. When the actuator 10 is in the passive state as illustrated in FIG. 1, the two steps engage, and set the maximum separation of the spring support piston 18 from the service braking piston. It will be appreciated that the provision of such a stop is advantageous as it means that the compliance spring 32 can be pre-charged, i.e. is compressed from its equilibrium state at all times. In other words, the compliance spring 32 is compressed even when the two steps are engaged and the separation of the two pistons 18, 30 is maximum. It will be appreciated, of course, that using engagement of the service braking piston 30 with the compliance control tube 58 is only one way of achieving this, and other ways, such as connecting the two pistons 18, 30 with an easily compressible yet substantially inextensible element, could equally be used.

A further aperture is provided in the second end face 12b of the housing 12 and the locking tube 36 extends through this aperture, the space enclosed by the locking tube 36 communicating with the locking control chamber port 40a.

Thus, during service braking, when pressurised fluid is supplied to the locking control chamber 40, the compliance control chamber 50 is also pressurised. This means that, even if the pressure of fluid in the service braking chamber 16b would, in itself, be sufficient to overcome the biasing force of the compliance spring, if the force exerted by the pressurised fluid in the service braking chamber 16b is not greater than force required to compress the pressurised fluid in the compliance control chamber 50, there will be no compression of the compliance spring 32. The service braking piston 30, spring support piston 18 and rod 20 will therefore move together as if connected by a rigid rod up to higher pressures than if the compliance control chamber 50 were not provided.

Without the compliance control chamber 50, the compliance spring 32 would start to compress at high service brake pressures. This is undesirable as this not only reduces the longevity of the compliance spring 32 but also increases the "active volume" for service braking. Specifically, during operation of an anti-lock braking system (ABS) it is desirable to reduce the applied braking force as quickly as possible, as any appreciable delay could increase the depth of the skid and reduce wheel control. If there is compression of the compliance spring 32 during routine service braking, during operation of the ABS, the initial reduction in pressure in the service braking chamber 16b would simply result in expansion of the compliance spring 32, and there could be a significant delay before any reduction in the braking force at the brakes is seen. This would have a detrimental effect on the performance of the ABS. With the compliance control chamber 50, higher service braking forces can therefore be attained without the compliance spring 32 compressing.

During application of the parking brake, both the locking control chamber 40 and the compliance control chamber 50 are vented to atmosphere, so compression of the compliance spring 32 is permitted as described above. The reduction in volume of the compliance control chamber 50 occurring during the initial application of the parking brake can be seen in FIG. 4.

To minimise the space occupied by the brake actuator 10 and modulator, the modulator is, in this example, located in a modulator housing 60 mounted on the second end face 12b of the actuator housing 12. Specifically, the modulator is located in the portion 60a of the modulator housing 60 directly adjacent the service braking chamber port 17, which facilitates a direct connection between the service braking chamber port 17 and the delivery port of the modulator.

The interior of the modulator housing 60 is vented to the atmosphere via an exhaust port 62 and a passage ventilation passage 64 provided in the actuator housing 12 extends from an exhaust volume 60b within the modulator housing 60 adjacent the exhaust port 62 to the return spring chamber 14. The modulator is arranged so that fluid from the modulator exhaust port is expelled into the exhaust volume 60b of the modulator housing 60.

During service braking, when the brakes are released, compressed air is expelled from the service braking chamber 16b and out of the modulator exhaust port. At the same time, the service braking piston 30 and spring support piston 18 move to reduce the volume of the service braking chamber 16b, and the volume of the return spring chamber 14 increases. By virtue of the provision of the ventilation passage 64, the fluid exhausted from the service braking chamber 16b, which is clean air from a compressed air reservoir, is drawn into the return spring chamber 14. Moreover, as the spring chamber 16a is connected to the return spring chamber 14 by the breathing apertures 18a in the spring support piston 18, fluid entering the spring chamber 16a during expansion of the compliance spring 32 is also clean air drawn from the return spring chamber 14.

This is advantageous compared to drawing atmospheric air into the return spring chamber 14, as the introduction of contaminants such as water and/or salt into the return spring chamber 14 and spring chamber 16a can be minimised or avoided altogether. Thus, the risk of corrosion of the return spring 24 and, more importantly the compliance spring 32, can be minimised. It will be appreciated that, in view of this arrangement, the boot 26 need not be provided to avoid contamination of the brake calliper.

Figure 6:
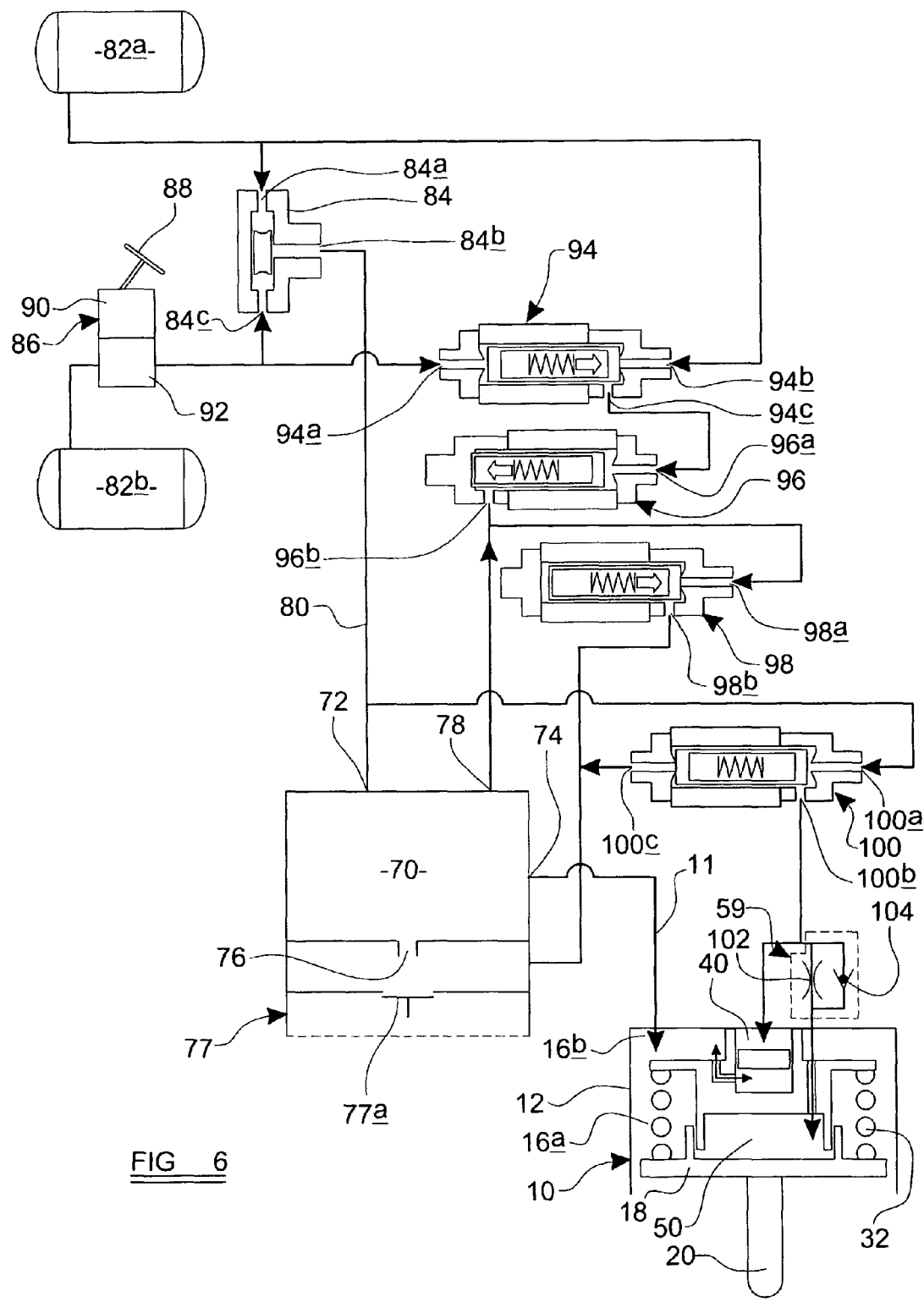
FIG. 6 shows a schematic illustration of a brake operating system including a brake actuator according to the invention.

An advantageous arrangement of valves which may be used to control operation of the brake actuator 10 as described above will now be described. Referring now to FIG. 6, there is shown a schematic illustration of the brake actuator 10 described above, a modulator 70 having a supply inlet 72, a delivery port 74, an exhaust outlet 76 and a control port 78. The modulator 70 includes an arrangement of pistons or diaphragms, movement of which is controlled by flow of pressurised fluid through the control port 78. The pistons or diaphragms can be controlled so that the modulator adopts one of three working states—a build configuration in which the supply inlet 72 is connected to the delivery port 74 and flow of fluid through the exhaust port 76 is substantially prevented, an exhaust configuration in which the delivery port 74 is connected to the exhaust port 76 and flow of fluid through the supply inlet 72 is substantially prevented, and a hold or lapped configuration in which flow of fluid through all three of the supply inlet 72, delivery port 74 and exhaust outlet 76 is substantially prevented. Various possible arrangements for achieving this are well known, and therefore are not described in detail here. Examples are described in our co-pending patent application GB0902989.3, or application GB2407131.

The exhaust outlet 76 vents to a low pressure region, in this example, to atmosphere via a water exclusion valve 77 which includes a valve member 77a which is biased to a closed position in which flow of fluid from the atmosphere, which may include water and/or salt, into the modulator via the exhaust outlet 76 is substantially prevented, but moves to open the exhaust outlet 76 when fluid pressure at the exhaust outlet builds to a minimal level, thus allowing fluid to be exhausted from the modulator 70. The water exclusion valve 77 may be as described in our co-pending UK patent application GB0902990.1.

The delivery port 74 of the modulator 70 is connected to the service braking chamber 16b of the actuator 10, whilst the supply inlet 72 is connected to a supply of pressurised fluid via a supply line 80. The supply of pressurised fluid comprises first 82a and second 82b pressurised fluid reservoirs and a double check valve 84. The double check valve 84 has a first inlet port 84a which is connected to the first compressed air reservoir, and an outlet port 84b which is connected to the supply line 80. The second pressurised fluid reservoir 82b is connected to a brake pedal valve assembly 86 comprising a brake pedal 88, an electrical braking demand signal generator 90 and a fluid pressure braking demand signal generator 92 which is supplied with pressurised fluid from the second reservoir 82b. Typically, the pressurised fluid used is compressed air.

The electrical braking demand signal generator 90 is configured so that on operation of the brake pedal by a driver of the vehicle in which the system is fitted causes the generation of an electrical braking demand signal which is generally proportional to the degree of deflection of the brake pedal, and hence indicative of the level of braking required by the driver. This signal is transmitted to a braking electronic control unit (not shown).

Similarly, the pneumatic braking demand signal generator 92 is configured so that on operation of the brake pedal 88 by a driver of the vehicle in which the system is fitted causes the generation of a fluid pressure braking demand signal (using fluid from the second reservoir 82b) the pressure of which is generally proportional to the degree of deflection of the brake pedal, and hence indicative of the level of braking required by the driver. This signal is transmitted via a fluid flow line to a second inlet port 84c of the double check valve 84, and also to a first inlet port 94a of a three port, two position valve hereinafter referred to as the redundancy valve 94.

The double check valve 84 is provided with a valve member which, if the pressure at the first inlet port 84a exceeds the pressure at the second inlet port 84c, moves to a first position to close the second inlet port 84c and connect the first inlet port 84a to the outlet port 84b, and if the pressure at the second inlet port 84c exceeds the pressure at the first inlet port 84a, moves to a second position to close the first inlet port 84a and connect the second inlet port 84c and the outlet port 84b.

The redundancy valve 94 is, in this example, a solenoid operated valve which, in addition to the first inlet port 94a, has a second inlet port 94b which is connected to the first pressurised fluid reservoir 82a, an outlet port 94c, and a valve member which is biased using a resilient biasing means such as a helical spring into a first position in which the first inlet port 94a communicates with the outlet port 94c and the second inlet port 94b is closed. In this example, a solenoid is provided, passage of an electrical current through the solenoid causing the valve member to move from the first position to a second position in which the first inlet port 94a is closed and the second inlet port 94b communicates with the outlet port 94c.

The outlet port 94c of the redundancy valve 94 is connected to an inlet port 96a of a two port, two position valve, hereinafter referred to as the build valve 96. The build valve 96 is, in this example, a solenoid operated valve which, in addition to the inlet port 96a, has an outlet port 96b, and a valve member which is biased using a resilient biasing means such as a helical spring into a first position in which fluid flow from the inlet port 96a to the outlet port 96b is permitted. In this example, a solenoid is provided, passage of an electrical current through the solenoid causing the valve member to move from the first position to a second position in which fluid flow from the inlet port 96a to the outlet port 96b is substantially prevented.

The outlet port 96b of the build valve 96 is connected to the control port 78 of the modulator 70 and to the inlet port 98a of a second two port, two position valve, hereinafter referred to as the exhaust valve 98. The exhaust valve 98 is, in this example, a solenoid operated valve which, in addition to the inlet port 98a, has an outlet port 98b, and a valve member which is biased using a resilient biasing means such as a helical spring into a first position in which fluid flow from the inlet port 98a to the outlet port 98b is substantially prevented. In this example, a solenoid is provided, passage of an electrical current through the solenoid causing the valve member to move from the first position to a second position in which fluid flow from the inlet port 98a to the outlet port 96b is permitted. The outlet port 98b of the exhaust valve 98 could simply be vented to atmosphere, but in this example is connected to the exhaust port 76 of the modulator 70 so that it vents to atmosphere via the water exclusion valve 77 which acts to prevent ingress of atmospheric fluids into the exhaust valve 98 in addition to the modulator 70.

Using an arrangement of modulator 70, brake pedal assembly 86, reservoirs 82a, 82b, valves, 84, 94, 96, 98 is known from prior art braking systems, and one of the novel aspects of this system resides in the provision of a further three port, two position valve, hereinafter referred to as the lock control valve 100. The lock control valve 100 has an inlet port 100a which is connected to the supply line 80, a delivery port 100b which is connected to the locking control chamber 40 (via the locking chamber port 40a) and the compliance control chamber 50 of the brake actuator 10, and an exhaust port 100c. The restrictor 59 is illustrated in the schematic shown in FIG. 6 as the line connecting the delivery port 100b to the compliance control chamber 50 splitting into two parallel lines, one including a choke 102, and the other a non-return valve 104 which is oriented to permit flow of fluid from the compliance control chamber 50 to the lock control valve 100 whilst preventing fluid flow in the opposite direction.

The exhaust port 100c may vent directly to atmosphere, or any other low pressure region, but as with the exhaust valve 98, in this example it is connected to the exhaust port 76 of the modulator 70 so that it vents to atmosphere via the water exclusion valve 77 which acts to prevent ingress of atmospheric fluids into the lock control valve 100. The lock control valve 100 also includes a valve member which is movable between a first position in which flow of fluid from the inlet port 100a to the outlet port 100b is permitted whilst the exhaust port 100c is closed, and a second position in which flow of fluid between the outlet port 100b and the exhaust port 100c is permitted whilst the inlet port 100a is closed. This valve 100 is provided with a solenoid, but, in this example, does not include resilient biasing means, and the valve member moves between the first and second positions only when an electrical current is passed through the solenoid. Such a valve is generally known as a bi-stable solenoid valve.

Other configurations of bi-stable solenoid valve may, of course, be used. For example, the valve 100 may include a magnet which holds the valve member in one of the first or second positions, a spring which holds the valve member in the other of the first or second positions, and a solenoid, passage of an electrical current through which one way causes the valve member to move against the biasing force of the spring, and the other way causes the valve member to move away from the magnet. If such a valve were used, it would preferably be oriented such that the spring holds the valve member in the first position, whilst the magnet holds the valve member in the second position. Equally, a purely mechanical mechanism for latching the valve member in each of the two positions may be employed, provided passage of an electrical current to the valve causes the valve member to move from the position it is latched in, to the other position.

Advantageously, in order to achieve a compact braking system, the ECU and redundancy 94, build 96, exhaust 98 and locking control 100 valves are located in the modulator housing 60, for example within the exhaust volume 60b.

The system is operated as follows. During normal driving of the vehicle, when there is no demand for braking, the system adopts the configuration illustrated in FIG. 6. There is no pneumatic braking control signal, so the valve member of the double check valve 84 is pushed by the pressure of fluid in the first reservoir 82a to the first position so that the supply line 80 is connected to the first reservoir 82a. Pressurised fluid at reservoir pressure is therefore supplied to the inlets of the modulator 72 and the locking control valve 100a. The locking control valve 100 is in its first position, so that its inlet port 100a is connected to its delivery port 100b, and hence pressurised fluid at reservoir pressure is also supplied to the locking control chamber 40 and the compliance control chamber 50.

No electrical power is supplied to the redundancy valve 94, the build valve 96 or the exhaust valve 98, so in each case, the valve member moves to its rest position, i.e. the position into which it is biased by the resilient biasing means. As such, whilst pressurised fluid is supplied to the second inlet port 94b of the redundancy valve 94, the second inlet port 94b is closed, and the first inlet 94a connected to the outlet port 94c, which is in turn connected to the control inlet 78 of the modulator 70 via the build valve 96. There is, however, no fluid pressure braking demand signal, so no pressurised fluid is supplied to the control inlet 78 of the modulator 70. This causes the modulator 70 to adopt the exhaust configuration, in which the delivery port 74 is connected to the exhaust port 76 and therefore vents to atmosphere. As a result, the service braking chamber 16b of the actuator 10 is also vented to atmosphere, and the spring support piston 18 and rod 20 are in the brake release position.

When service braking is required, the brake pedal 88 is actuated which causes the electrical braking demand signal generator 90 to generate an electrical braking demand signal and to transmit this to the braking ECU. The braking ECU is connected to the solenoids of the redundancy, build, exhaust and locking control valves 94, 96, 98, 100, and an electrical current is applied to the solenoid of the redundancy valve 94 which causes the valve member to move to the second position in which the first inlet 94b is connected to the outlet port 94c. Pressurised fluid from the first reservoir 82a is therefore supplied to the control inlet 78 of the modulator 70 via the build valve 96. This causes the modulator 70 to adopt the build configuration in which the supply inlet 72 is connected to the delivery port 74 whilst the exhaust outlet 76 is closed. Pressurised fluid is therefore supplied to the service braking chamber 16b of the brake actuator 10, which causes the service braking piston 32 to move to increase the volume of the service braking chamber 16b and to push the spring support piston 18 and rod 20 to the brake apply position, and therefore to actuate the vehicle brakes. No electrical power is supplied to the locking control valve 100, so supply of pressurised fluid to the locking control chamber 40 and compliance control chamber 50 is maintained. There is, therefore, no compression of the compliance spring 32 during this operation.

A pressure sensor is provided to monitor the pressure in the service braking chamber 16b, and this transmits an electrical pressure signal to the ECU. When the ECU determines that the pressure in the service braking chamber 16b is at the level demanded by the braking demand signal, electrical signals are transmitted to the solenoids of the build valve 96, so that the valve member of the build valve 96 moves to the second position, and closes the inlet port 96a. The modulator 70 then moves to the hold configuration in which the delivery port 74 is effectively closed, and therefore the pressure in the service braking chamber 16b, and hence the braking force is maintained at the desired level.

When the driver demand for braking pressure is no longer present, and the braking demand signal falls to zero, the ECU sends an electrical current to the exhaust valve 98 so that the control inlet 78 of the modulator 70 vents to atmosphere until the pressure at the control inlet 78 is reduced to atmospheric pressure, and the modulator 70 moves to the exhaust position. At this point, the delivery port 74 of the modulator 70 becomes connected to the exhaust port 76, and the fluid pressure in the service braking chamber 16b of the actuator falls to atmospheric pressure too. The service braking piston 32, spring support piston 18 and rod 20 therefore move under the influence of the return spring back to the brake release position, and the braking force is removed.

Again, the position of the valve member of the locking control valve 100 is not changed during this process, so the locking control chamber 40 and compliance control chamber 50 are still pressurised.

By virtue of this arrangement of control valves, the service braking chamber 16b and the compliance control chamber 50 are connected to the same source of pressurised fluid, and are therefore at the same pressure. If, as suggested above, the entire space between the spring support piston 18 and the service braking piston 30 were used as the compliance control chamber 50, the force resisting the compression of the compliance spring 32 would be extremely high—far higher than required. Given than the movement of the service braking piston 30 towards the spring support piston 18 is already resisted by the compliance spring 32, the additional force generated by the compliance chamber 50 is only required to supplement the force provided by the spring and to bring the total force up to the maximum service braking force.

It is therefore preferred that the compliance control chamber 50 is provided in a relatively small, central portion of the space between the spring support piston 18 and the service braking piston 30. Despite the fact that this reduces the force resisting compression of the compliance control chamber 50 provided by the fluid pressure in that chamber 50, the ratio of the surface area of the service braking piston 30 over which fluid pressure in the compliance chamber 50 acts to the surface area of the service braking piston 40 over which fluid pressure in the service braking chamber 16b acts is calculated to be high enough to prevent compression of the compliance spring 32 even at high service braking pressures.

This is how service braking is normally operated, however, it is a legal requirement to provide a back-up system which enables service braking in the event of a complete electrical power failure or accidental loss of pressure in the first reservoir 82a through a fractured line or the like. As mentioned previously, actuation of the brake pedal 88 causes a fluid pressure braking signal demand signal to be transmitted to the double check valve 84 and to the first inlet port 94a of the redundancy valve 94.

In the event of electrical power failure, the redundancy, build and exhaust valves 94, 96, 98 are in their rest positions, and, as such, the first inlet port 94a of the redundancy valve 94 is connected to the control inlet 78 of the modulator 70 via the build valve 96, and the exhaust valve 98 is closed. As such, the fluid pressure braking demand signal from the second reservoir 82b causes the modulator 70 to move to the build configuration, and allow passage of fluid from the first reservoir 82a from the supply inlet 72 of the modulator 70 to the brake actuator 10 to operate the brakes.

In the event of loss of pressure in the first reservoir 82a, the valve member of the double check valve 84 will move automatically to allow passage of the fluid pressure braking demand signal to the supply line 80, whilst closing the connection between the supply line 80 and the first reservoir 82a. The fluid pressure braking demand signal will therefore pass via the supply line to the supply inlet 72 of the modulator 70 and the inlet port 100a of the locking control valve 100, and also to the control inlet 78 of the modulator 70 via the redundancy valve 94 and build valve 96.

The pressure of the fluid pressure braking demand signal at the control inlet 78 of the modulator 70 causes the modulator 70 to adopt the build position, so that the fluid pressure braking demand signal at the supply inlet 72 passes via the delivery outlet 74 to the service braking chamber 16b of the actuator 10 which causes the service braking piston 32 to move to increase the volume of the service braking chamber 16b and to push the spring support piston 18 and rod 20 to the brake apply position, and therefore to actuate the vehicle brakes as before. The supply of pressurised fluid for brake actuation is therefore supplied by the second reservoir 82b.

The system also includes a parking brake lever, button or the like, which is actuated if parking braking is required. This results in an electrical parking brake signal being transmitted to the ECU which in turn acts exactly as described in relation to service braking to apply a braking force, but also sends an electrical signal to the locking control valve 100 to move the valve member to the second position. The locking control chamber 40 and compliance chamber 50 are therefore exhausted to atmosphere. The pressure in the service braking chamber 16b is brought to a sufficiently high pressure to compress the compliance spring 32 to the required degree, and the pressure in the service braking chamber 16b is then released by the supply of the an electrical current to the exhaust valve 98. As the locking control chamber 40 is no longer pressurised, the locking means is actuated and acts as described above to prevent the service braking piston 30 from retracting to reduce the volume of the service braking chamber 16b, i.e. to lock the brakes in the applied position. The spring support piston 18 and rod 20 therefore remain in the brake apply position, and the braking force is maintained even if electrical power to the braking system is shut off or fails.

It should be noted that if the brake pedal 88 is actuated whilst the vehicle is parked, the resulting fluid pressure braking demand signal would be transmitted to the control inlet 78 of the modulator 70 via the redundancy valve 94 and the build valve 96, and this could cause the modulator 70 to move to the build position to direct pressurised fluid to the service braking chamber 16b of the actuator 10. But, because the locking control valve 100 remains in the second position, the locking control chamber 40 and compliance control chamber 50 remain vented to atmosphere. As such, if the pressure of the fluid pressure braking demand signal were sufficiently high it would cause further compression of the compliance spring 32 before applying additional force to the brakes. As such, the potential for damaging the brakes is limited, and can be avoided by setting a maximum limit to the fluid pressure braking demand signal which of the order of or is less than that required to achieve maximum compression of the compliance spring 32.

Electrical release of the parking brake is achieved by the ECU applying an electrical current to the locking control valve 100 to move it back to the first position, and to the redundancy valve 94 to move it to the second position, thus building up the pressure in the service braking chamber 16b, locking control chamber 40 and compliance chamber 50 in the same way as if service braking were required. When the pressure in the service braking chamber 16b is sufficiently large to "unload" the lock, the locking piston 34 moves under the action of the locking return spring 42 to increase the volume of the locking control chamber 40 and disengage the ball bearings from the locking ring 48, and thus release the lock as described above.

Before the pressure in the service braking chamber 16b is sufficiently high to release the lock, the pressure building in the compliance chamber 50 may push the spring support piston 18 and rod 20 to reduce further the volume of the first chamber 14, thus increasing the force applied to the vehicle brakes. If the fluid pressure in the compliance chamber 50 were to increase at the same rate as the pressure in the locking chamber 40 there is a possibility that, before the locking means is released, the pressure in the compliance chamber 50 rises to a sufficiently high level to cause damage to the brakes. It is therefore advantageous to provide the restrictor 59 in the connection between the outlet port 100b of the locking control valve 100 as this ensures that there is a delay in the increase in fluid pressure in the compliance control chamber 50 compared to the locking control chamber 40 (without delaying exhausting of fluid from the compliance chamber 50). Such damage is therefore avoided.

It will be appreciated that release of the parking brake as described above requires a pressurised fluid and electrical power supply to the braking system. It is a legal requirement also to provide an additional, self-contained, means of releasing the parking brake, and this is achieved using a release bolt 110, which for clarity is illustrated in FIG. 1 only. The release bolt 110 has a head 110a and a threaded shaft 110b which extends through a bolt hole in the modulator housing 60 into the cylindrical space enclosed by the locking tube 36. The head 110a of the bolt 110 is outside the modulator housing 60, and a hexagonal nut 112 is threaded on the shaft 110a of the bolt 110 so that the modulator housing wall lies between the head 110a and the nut 112. The nut 112 is held captive so that rotation of the nut 112 with the bolt 110 is substantially prevented. As such, if a tool such as a spanner or Allen key is engaged with the head 110a of the bolt 110 and the bolt 110 turned in the bolt hole, the nut 112 will be driven to move longitudinally down the shaft 110b (away from the head 110a) until it engages with the locking tube 36. Further downward movement of the nut 112 un-loads the lock, thus allowing the locking piston 34 to move under the force of the locking return spring 42 to bring the ball bearings 46 out of engagement with the locking ring 48. The lock is thus released, and the spring support piston 18 and rod 20 can return to the brake release position.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A brake actuator having a housing in which is provided a movable brake actuating assembly, the brake actuating assembly being movable between a brake apply position which, in use, results in the application of a brake to which the actuator is connected, and a brake release position which, in use, results in the release of the brake, the brake actuator further including a lock which is operable to prevent movement of the brake actuating assembly from the brake apply position to the brake release position, the brake actuating assembly including a first movable member, a second movable member and a resilient biasing element which extends between the second movable member and the first movable member and which, if one of the first or second movable members is moved relative to the other from an equilibrium separation, exerts a force tending to return the first and second movable members to the equilibrium separation, the brake actuator further including a compliance control chamber between the first movable member and the second movable member, the compliance control chamber having a port and being sealed such that flow of fluid into or out of the compliance control chamber other than through the port is substantially prevented;

wherein flow of fluid into or out of the compliance control chamber other than via the port is prevented by virtue of the provision of a substantially fluid tight seal between the first movable member and the second movable member, the seal being configured to permit movement of one of the first or second movable members relative to the other whilst preventing flow of fluid into or out of the compliance control chamber other than via the port; and wherein a restrictor is provided to restrict flow of fluid through the port into the compliance control chamber relative to flow of fluid through the port to exit the compliance control chamber.

2. A brake actuator according to claim 1 wherein the resilient biasing element is configured to exert a force tending to return the first and second movable members to the equilibrium separation when one of the first or second movable members is moved relative to the other to decrease the separation of the first and second movable members.

3. A brake actuator according to claim 1 wherein a braking control chamber is provided between the housing and the brake actuating assembly, the braking actuating assembly being movable under the influence of fluid pressure in the braking control chamber.

4. A brake actuator according to claim 1 wherein, during operation of the lock, movement of the brake actuating assembly from the brake apply position to the brake release position is prevented by the lock acting on the second movable member to restrict movement of the second movable member.

5. A brake actuator according to claim 4 wherein the lock includes a latch part which is movable into engagement with the second movable member to restrict movement of the second movable member.

6. A brake actuator according to claim 3 wherein there is a substantially fluid tight seal between the second movable member and the housing so that the second movable member and the housing form the braking control chamber, and the housing includes an inlet which extends from the exterior of the housing into the braking control chamber.

7. A brake actuator according to claim 1 wherein the brake actuator further includes a second resilient biasing element which extends between the first movable member and the housing and which, if the first movable member is moved relative to the housing from the brake release position, exerts a force tending to return the first movable members to the brake release position.

8. A brake actuator according to claim 1 wherein the resilient biasing element is not contained within the compliance control chamber.

9. A brake actuator according to claim 1 wherein the first movable member is one of a piston and a diaphragm.

10. A brake actuator according to claim 1 wherein the second movable member is one of a piston and a diaphragm.

11. A braking control assembly including a modulator which has a supply inlet connected to a source of pressurised fluid, an exhaust outlet which is vented to a low pressure region, and a delivery port, the modulator being operable to move between a build position in which the supply inlet is connected to the delivery port and the exhaust outlet substantially closed, and an exhaust position in which the delivery port is connected to the exhaust outlet and the supply inlet is substantially closed, the braking assembly further including a brake actuator having a housing in which is provided a movable brake actuating assembly, the brake actuating assembly being movable between a brake apply position which, in use, results in the application of a brake to which the actuator is connected, and a brake release position which, in use, results in the release of the brake, the brake actuator further including a lock which is operable to prevent movement of the brake actuating assembly from the brake apply position to the brake release position, the brake actuating assembly including a first movable member, a second movable member and a resilient biasing element which extends between the second movable member and the first movable member and which, if one of the first or second movable members is moved relative to the other from an equilibrium separation, exerts a force tending to return the first and second movable members to the equilibrium separation, the brake actuator further including a compliance control chamber between the first movable member and the second movable member, the compliance control chamber having a port and being sealed such that flow of fluid into or out of the compliance control chamber other than through the port is substantially prevented, there being a substantially fluid tight seal between the second movable member and the housing so that the second movable member and the housing form the braking control chamber, and the housing includes an inlet which extends from the exterior of the housing into the braking control chamber, wherein the inlet in the actuator housing is connected to the delivery port of the modulator;

wherein the brake actuator further includes a locking control chamber, wherein the lock is operable in response to supply and release of fluid to and from the locking control chamber; and wherein the port into the compliance control chamber is connected to the locking control chamber such that when pressurised fluid is supplied to the locking control chamber, the compliance chamber is also pressurised.

12. A braking control assembly according to claim 11 wherein the port is connected to the source of pressurised fluid.

13. The braking control assembly according to claim 1, wherein the brake actuator further includes a locking control chamber, wherein the lock is operable in response to supply and release of fluid to and from the locking control chamber.

14. The braking control assembly according to claim 13, wherein the port into the compliance control chamber is connected to the locking control chamber such that when pressurised fluid is supplied to the locking control chamber, the compliance chamber is also pressurised.

15. The brake actuator according to claim 14, wherein the locking control chamber is formed between the lock and the housing and a resilient biasing member is disposed within the locking control chamber.

16. The brake actuator of claim 15, wherein a braking control chamber is provided between the housing and the brake actuating assembly, the brake actuating assembly being movable under the influence of fluid pressure in the braking control chamber, wherein movement of the lock against the biasing force of the resilient biasing member to decrease the volume of the locking control chamber can be performed by exhausting pressurised fluid from the locking control chamber while retaining fluid pressure in the braking control chamber.

* * * * *

UNITED STATES PATENT AND TRADEMARK OFFICE
CERTIFICATE OF CORRECTION

PATENT NO. : 8,851,243 B2
APPLICATION NO. : 13/262188
DATED : October 7, 2014
INVENTOR(S) : Prescott et al.

It is certified that error appears in the above-identified patent and that said Letters Patent is hereby corrected as shown below:

In the Specification,
In Col. 3, line 60, please delete "shows cross-section" and insert -- shows a cross-section --;
In Col. 6, line 38, please delete "Whilst it will" and insert -- It will --;
In Col. 7, line 18, please delete "appreciated the" and insert -- appreciated that the --;
In Col. 7, line 22, please delete "42" and insert -- 40 --;
In Col. 7, line 41, please delete "34" and insert -- 36 --;
In Col. 9, line 10, please delete "service piston" and insert -- service braking piston --;
In Col. 12, line 47, please delete "on" and insert -- one --;
In Col. 12, line 55, please delete "on" and insert -- one --;
In Col. 13, line 51, please delete "of modulator" and insert -- of the modulator --;
In Col. 13, line 52, please delete "82b, valves, 84" and insert -- 82b and valves 84 --;
In Col. 14, line 19, please delete "of bi-stable" and insert -- of the bi-stable --;
In Col. 14, line 48, please delete "72" and insert -- 70 --;
In Col. 14, line 48, please delete "100a" and insert -- 100 --;
In Col. 14, line 60, please delete "inlet 94a connected" and insert -- inlet port 94a is connected --;
In Col. 15, line 12, please delete "94b" and insert -- 94a --;
In Col. 15, lines 19-20, please delete "service braking piston" and insert -- compliance spring --;
In Col. 15, line 49, please delete "service braking piston" and insert -- compliance spring --;
In Col. 15, line 65, please delete "than" and insert -- that --;
In Col. 16, line 12, please delete "40" and insert -- 30 --;
In Col. 16, line 22, please delete "signal demand signal" and insert -- demand signal --;
In Col. 16, line 49, please delete "outlet" and insert -- port --;
In Col. 16, line 60, please delete "service braking" and insert -- compliance spring --;
In Col. 17, line 1, please delete "of the an" and insert -- of an --;
In Col. 17, line 25, please delete "which of the order of or" and insert -- which is of the order or --;
In Col. 18, line 1, please delete "shaft" and insert -- head --; and In the Claims,
In Col. 19, line 5, please delete "braking" and insert -- brake --.

Signed and Sealed this
Twenty-fourth Day of March, 2015

Michelle K. Lee
*Director of the United States Patent and Trademark Office*